United States Patent [19]

Zengel et al.

[11] 4,393,238
[45] Jul. 12, 1983

[54] METHOD FOR THE PRODUCTION OF BLOCKED ISOCYANATES

[75] Inventors: Hans-Georg Zengel, Kleinwallstadt; Manfred Bergfeld, Erlenbach, both of Fed. Rep. of Germany

[73] Assignee: Akzo NV, Arnhem, Netherlands

[21] Appl. No.: 265,321

[22] Filed: May 18, 1981

[30] Foreign Application Priority Data

May 22, 1980 [DE] Fed. Rep. of Germany ....... 3019491

[51] Int. Cl.³ ............................................. C07C 131/00
[52] U.S. Cl. .................................................... 564/255
[58] Field of Search ............................... 564/255, 114; 260/453 P

[56] References Cited

U.S. PATENT DOCUMENTS 3,726,921 4/1973 Kamal ................................. 564/255
3,897,498 7/1975 Zengel et al. ...................... 564/114
4,282,167 8/1981 Sy et al. ........................... 260/453 P

OTHER PUBLICATIONS

Morrison & Boyd "Organic Chemistry" 2nd Ed. (1966), pp. 735–736, Allyn and Bacon, Publ.
Smith, Peter A. S. "The Chemistry of Open-Chain Organic Nitrogen Compounds" vol. (1965) p. 197, W. A. Benjzmin, Publ.

Primary Examiner—Natalie Trousof
Assistant Examiner—L. Hendriksen
Attorney, Agent, or Firm—Michael J. Striker

[57] ABSTRACT

Blocked isocyanates of the general formula

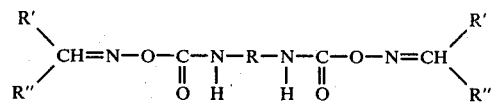

are obtained by converting terephthalic dialdoxime, isophthalic dialdoxime or an aliphatic, cycloaliphatic or aromatic ketoxime or an aromatic aldoxime of the general formula

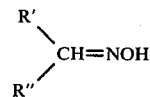

in the presence of 10-100 Mol % sodium, potassium or calcium hydroxide, with the sodium, potassium or calcium salt of a bis-N-chloramide of the general formula

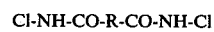

Cl-NH-CO-R-CO-NH-Cl in water or a mixture of water and an aprotic solvent. Preferred first components include terephthalic dialdoxime, benzaldehyde-, cyclohexanone-, acetone- and acetophenoneoxime. Preferred aprotic solvents include dimethyl acetamide, dimethylformamide, sulfolan and tetramethylurea.

4 Claims, No Drawings

METHOD FOR THE PRODUCTION OF BLOCKED ISOCYANATES

BACKGROUND OF THE INVENTION

The present invention concerns a method for the production of blocked isocyanates from a bis-N-chloramide and an aromatic aldoxime or an aliphatic, cycloaliphatic or aromatic ketoxime.

On account of their high reaction capability and their decomposability by water, isocyanates have been produced, preserved and converted in the form of easily cleavable adducts (blocked or masked isocyanates or isocyanate-precursors). In the coatings industry in particular such isocyanate adducts play an important role. Easily cleavable adducts are obtained from isocyanates and for example phthalimide, imidazole, caprolactam, phenylmethylpyrazolone, diphenylamine, alcohols, phenols, hydrocyanic acid, bisulfite and oximes. (O. Bayer, Angew. Chem. 59 (1947), pp. 257 et seq.) On account of their low cleavage temperature, oxime-blocked isocyanates are of particular interest. Their production follows through the addition of oximes to the isocyanate in an inert milieu, for example in benzene or ether. A drawback to this is that the isocyanate is first synthesized and a water-free solvent must be used with the adduct formation. The oxime-blocked isocyanates obtained in this manner contain traces of free isocyanate, so that toxicity problems occur with their working up. There exists therefore the need for a method which makes possible the direct production of oxime-blocked isocyanates.

SUMMARY OF THE INVENTION

The subject of the present invention is therefore a method for the production of blocked isocyanates of the general formula

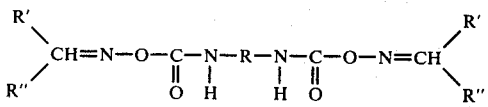

in which R, R' and R" represent an aliphatic, cycloaliphatic or aromatic hydrocarbon residue, whereby R' and R" can be the same or different, and when R' is an aromatic residue, R" can also be a hydrogen atom, thereby characterized in that terephthalic dialdoxime, isophthalic dialdoxime or an aliphatic, cycloaliphatic or aromatic ketoxime or an aromatic aldoxime of the general formula

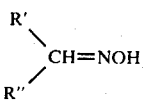

is converted in the presence of 10–100 mol% sodium-, potassium- or calcium-hydroxide—relative to the ketoxime or aldoxime used—with the sodium-, potassium- or calcium-salt of a bis-N-chloramide of the general formula

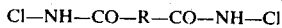

in water or a mixture of water and an aprotic solvent.

The progress of the reaction based upon the method according to the present invention must be characterized as surprising. The conversion of aldoximes with chloramides in aprotic solvents does not lead namely to the desired blocked isocyanates. The chloramide acts here as oxidation agent, forming α-chloraldoxime, which in turn, as is well known, forms nitrile oxide in the presence of an auxiliary base. If one works in neutral, aqueous milieu, so the oxime reacts with N-halogenamide alkali salt, to form phenacylureas. It was therefore not anticipated that under the conditions of the method according to the present invention oxime-blocked isocyanates are accessible.

With the method according to the invention aliphatic, cycloaliphatic and aromatic bis-N-chloramide can be used. For example, suitable aliphatic bis-N-chloramides are succinic acid-bis-N-chloramide, adipinic acid-bis-N-chloramide, pimelic acid-bis-N-chloramide, suberic acid-bis-N-chloramide, sebacic acid-bis-N-chloramide, dodecane-1,12-dicarboxylic acid-bis-N-chloramide and bis-N-chloramides of longer-chain dicarboxylic acids such as for example "Empol 1010" with 24–51 carbon atoms. As cycloaliphatic bis-N-chloramides for example cyclohexane-1,4-bis-N-chloramide comes into consideration. Examples of suitable aromatic bis-N-chloramides are 4-methyl-isophthalic acid-bis-N-chloramide, methylterephthalic acid-bis-N-chloramide, terephthalic acid-bis-N-chloramide, isophthalic acid-bis-N-chloramide, diphenyl ether-4,4'-dicarboxylic acid-bis-N-chloramide, ethylene-1,2-bis-phenyl-4,4'-carboxylic acid-bis-N-chloramide and naphthalene-2,6-dicarboxylic acid bis-N-chloramide. The bis-N-chloramide necessary for accomplishment of the method according to the present invention is easily accessible from the appropriate dicarboxlyic acid, for example by chlorination by means of chlorine according to the method of the German Pat. Nos. 25 02 411, 25 02 412 and 25 59 520.

As oxime an aromatic aldoxime or an aliphatic, cycloaliphatic or aromatic ketoxime will be used in the method according to the present invention. Examples of suitable aromatic aldoximes are benzaldoxime, tolylaldoxime, terephthalic dialdoxime, and isophthalic dialdoxime. Suitable ketoximes are acetone oxime, methylethyl ketoxime, methylpropyl ketoxime, 2-butanone oxime, methylisobutyl ketoxime, 3-methyl-2-butanone oxime, diisobutyl ketoxime, 2-pentanone oxime, 3-pentanone oxime, 4-methyl-2-pentanone oxime, 2-heptanone oxime, 3-heptanone oxime, ethylhexyl ketoxime, cyclohexanone oxime, acetophenone oxime and benzophenone oxime. Upon use of the oxime-blocked isocyanates the customarily cleaved oximes will not be recovered, thus on economic reasons the least expensive oxime possible for production of the blocked isocyanates will be used. With the method according to the present invention preferably benzaldehyde-, cyclohexanone-, acetone- and acetophenoneoxime will be used.

The bis-N-chloramide will be used in the form of its sodium, potassium or calcium salt. Obviously the conversion can also be accomplished with the corresponding rubidium-, cesium-, strontium- or barium-salt; however on economic reasons these do not come into consideration as starting material. On technical process reasons, it is advantageous not to proceed from prepared salts of bis-N-chloramide, but in place of that bis-N-chloramide should be submitted and alkali- or earth alkali-hydroxide solution introduced, so that in this manner the desired alkali- or earth alkali-salt will be present in the reaction mixture.

The oxime can also be used in the form of its sodium-, potassium- or calcium-salt. Howver, it is significant to use the free oxime and to add this to the alkali- or earth alkali-hydroxide. In the reaction mixture the oxime must be present at least in part as alkali- or earth alkali-salt. The yield of oxime-blocked isocyanate is then best if all of the oxime is present as salt. A further surplus of alkali does not increase the yield much in comparison, and there occurs in some cases even a decrease in yield as a result of the formation of amines. For these reasons, the alkali- or earth alkali portion which is necessary for the formation of the oxime salt should lie between 10 and 100 mol%, relative to the oxime. If the total used amount of alkali- or earth alkali-hydroxide is not sufficient to convert at least a portion of the oxime into the alkali- or earth alkali-salt, it will thus be worked up in a neutral medium, so that, as demonstrated in comparison Example 1, no oxime-blocked isocyanate, but rather phenacylurea is obtained.

The chloramide and the oxime can be present in different salt forms. However, on economic reasons, they will be worked up only with one hydroxide.

The reaction partners will preferably be used in stoichiometric amounts, but the oxime can also be used in a small excess.

With the method according to the present invention water or a mixture of water and an aprotic solvent will be used. Preferred aprotic solvents are dimethylacetamide, dimethylformamide, sulfolan and tetramethylurea. On economic reasons water will preferably be used as solvent. As demonstrated in comparison Example 2, with the use of non-protic solvents no oxime-blocked isocyanates are obtained.

The reaction temperature should lie between 20° and 100° C., preferably between 20° and 60° C. The duration of the reaction depends upon the reaction temperature and the choice of reaction partners. It lies as a rule between 1 and 12 hours. The conversion is then finished when the reaction mixture no longer effects oxidizing. This can easily be determined with the aid of potassium iodide/starch paper.

The dilution of the reaction mixture is in no manner significant. The reaction can be carried out not only homogeneously but also heterogeneously, without noteworthy difference in yield occurring.

The accomplishment of the method according to the present invention follows in simple manner: The bis-N-chloramide is suspended in solvent, and through the addition of hydroxide converted to the salt form, whereby a solution is formed, whereafter aldoxime or ketoxime is dosed into the mixture with agitation and cooling, and the reaction mixture, if necessary under increased temperature, is allowed to react. The conversion is then complete when the reaction mixture no longer displays an oxidizing action, which can easily be determined with the aid of a potassium iodide-starch paper.

The desired oxime-blocked isocyanate falls from the reaction mixture as an oxime carbamate, which can for example by means of ice water be washed and, if necessary, purified through recrystallization.

The method according to the present invention possesses significant advantages in comparison to the known methods. The direct synthesis of blocked isocyanates according to the present invention from chloramide is very economical in comparison to the traditional methods, according to which initially the pure isocyanate is produced and thereupon through addition the blocked isocyanates are obtained. A particular advantage of the method according to the present invention is that it can be accomplished in an aqueous milieu, and that the obtained blocked isocyanates contain no traces of free isocyanate. This characteristic is extraordinarily valuable with use of the product in the coatings industry, since diisocyanates, in particular the easily volatile aliphatic diisocyanates, give rise to great toxicological problems. A further advantage is that the method according to the present invention, which proceeds from a carboxylic acid derivative, offers greater possibilities relative to the kind of isocyanates produced from the blocked isocyanates, when compared to the classical method of isocyanate synthesis from diamines by means of phosgene.

The novel features which are considered characteristic for the invention are set forth in particular in the appended claims. The invention itself, howver, both as to its construction and its method of operation, together with additional objects and advantages thereof, will be best understood from the following description of specific embodiments.

DESCRIPTION OF THE PREFERRED EMBODIMENTS

EXAMPLE 1

32.6 g (0.1 Mol) diphenylether-4,4'-bis-N-chloramide was dispersed in 300 ml water at 0° C. with vigorous stirring and then dissolved at 0° C. with 16.1 g (0.4 Mol) sodium hydroxide in 400 ml water, added dropwise. The drop velocity was so adjusted that the temperature of the retort contents did not rise above 5° C. To the clear solution 14.7 g (0.02 Mol) acetone oxime was quickly dosed at 0° C. The light brown colored clear solution was then stirred for 2 hours at 5° C. and subsequently allowed to react for 5 hours at 30° C. Already after 15 minutes at room temperature a colorless voluminous precipitation began to separate. After the end of the reaction (proven with potassium iodide starch paper) the reaction mixture was neutralized with dilute hydrochloric acid. The precipitate was filtered across a glass frit and washed chloride-free with ice water, and then dried in a vacuum drying oven at 45° C. In this manner 33.5 g (0.084 Mol) of ketoxime carbamate. 84% of the theoretical amount, was obtained. The compound displayed good solubility in all aprotic solvents such as e.g. dimethyl formamide and dimethylacetamide as well as in lower alcohols such as methanol, ethanol, as well as in acetone, methylene chloride, chloroform and acetate ester. After recrystallization in ethanol/water, the compound deposited in the form of beige needles with a melting point of 75° C. The structure of the compound was confirmed through $^1$H-NMR, IR, MS-spectrum as well as through elementary analysis and through a comparison with a synthetic product produced from diphenyl ether-4,4'-diisocyanate and acetone oxime.

EXAMPLE 2

Analogous to Example 1, 29.8 g dodecane-1,12-bis-N-chloramide (0.1 Mol) was place in 600 ml water with 16.1 g (0.4 Mol) sodium hydroxide at 0° C. to form a solution. Thereafter 14.7 g (0.2 Mol) acetone oxime was introduced to the reaction solution, the velocity of addition so dosed that the interior temperature did not exceed 5° C. The reaction solution remained at 5° C. for a further hour, and subsequently under vigorous stirring the cooling was removed. As soon as the reaction mixture had reached room temperature a colorless, voluminous precipitate began to fall out. The reaction mixture was further stirred at room temperature for 5 hours and displayed thereafter no more oxidizing effect. The precipitate was filtered across a glass frit and gradually washed with 250 ml ice water. After drying, 29.3 g of a brownish, waxy mass was obtained, and through recrystallization from aqueous ethanol 27.0 g (0.0728 Mol) corresponding to 72.8% of the theoretical amount of an oxime-blocked dodecane diisocyanate was obtained. The identity of this compound was guaranteed through elementary analysis, IR and 1H-NMR-spectrum as well as a comparison with the synthetic compound obtained from free isocyanate and acetoxime.

EXAMPLE 3

Analogous to Example 1, 23.3 g terephthalic acid-bis-N-chloramide (0.1 Mol) and 29.2 g acetophenone oxime (0.216 Mol) was placed in a solution of 16.5 g (0.412 Mol) sodium hydroxide in 1 liter water for 6 hours at 30°–35° C. As in Example 1, already upon heating of the reaction mixture from 0° C. to room temperature a voluminous white precipitate began to deposit. When the reaction mixture no longer effected oxidizing, the precipitate was filtered across a glass frit and gradually washed with a total of 150 ml water and subsequently 50 ml ethanol, and then dried in vacuum at 80° C. In this manner 27.2 g, corresponding to 63.2% of the theoretical amount, of a compound was obtained, which was identical with a synthetic substance obtained from p-phenylene diisocyanate and acetophenone oxime. The compound began to decompose above 160° C. and was soluble only in polar aprotic solvents such as dimethylformamide, dimethylacetamide, sulfolan, tetramethylurea and dimethylsulfoxide.

EXAMPLE 4

Analogous to Example 1, 32.6 g (0.1 Mol) diphenyl ether-4,4'-bis-N-chloramide as well as 27.1 g (0.2 Mol) acetophenone oxime was placed in a solution of 16.1 g (0.402 Mol) sodium hydroxide in 800 ml water. After an entire reaction period of 6 hours at 30° C. the reaction mixture was no longer oxidizing and it was filtered from the formed light brown fine precipitate across a glass frit. After a neutral washing with a total of 150 ml ice water the precipitate was dried at 50° C. under about 10 Torr in a vacuum. It was subsequently recrystallized from water/ethanol and in this manner 42.5 g (corresponding to 81.3% of theory) of an acetophenone oxime-blocked diphenylether-4,4'-diisocyanate was obtained with a softening point of 55° C. and a melting point (with decomposition) of 110° C. (i.e. gas generation). The compound displayed good solubility in aprotic solvents such as dimethylformamide, sulfolan, dimethylacetamide, dimethylsulfoxide as well as in methanol, ethanol, methylene chloride, was moderately soluble in chloroform, slightly soluble in boiling carbon tetrachloride and practically insoluble in water, ligroin and cyclohexane.

EXAMPLE 5

Analogous to Example 1, 21.4 g (0.1 Mol) adipinic acid-bis-N-chloramide (99%) and 22.7 g (0.2 Mol) cyclohexanone oxime were placed in a solution of 16.1 g (0.402 Mol) sodium hydroxide in 700 ml water. The initial solution, clear and colorless at 5° C., became cloudy quickly upon reaching room temperature, and a colorless crystalline precipitate separated out. After 8 hours at 30° C. the reaction mixture was no longer oxidizing, and it was filtered from the light beige precipitate. The precipitate was then neutrally washed with several portions of ice water. After drying at 50° C. and 20 Torr until constant weight, 17.4 g corresponding to 47.5% of theory of the desired compound was obtained in the form of a fine colorless powder. After neutralization of the alkaline mother liquor with dilute hydrochloric acid to a pH of 6, and through extraction with methylene chloride, a further 6.2 g (corresponding to 17.2% of theory) of cyclohexanone oxime-blocked tetramethylene-1,4-diisocyanate with a melting point of 163°–165° C. was obtained. The compound, its structure guaranteed through elementary analysis, 1H-NMR, IR-spectrum as well as through comparison with a synthetic specimen produced from the diisocyanate and cyclohexanone oxime, displayed good solubility in polar aprotic solvents such as dimethylformamide as well as lower alcohols, lower ketones, methylene chloride, chloroform, moderate solubility in $CCl_4$, slight solubility in cyclohexane and practically no solubility in water. Purification followed through recrystallization from methylene chloride.

EXAMPLE 6

Analogous to Example 1, 23.3 g (0.1 Mol) terephthalic acid-bis-N-chloramide and 26.2 g (0.216 Mol) benzaldoxime were placed with one another in a solution of 16.8 g (0.42 Mol) sodium hydroxide in 1 liter water, until oxidizing effect in the reaction mixture was no longer evident. From the initial solution, colorless at 0°–5° C., there was precipitated upon reaching of room temperature a colorless voluminous precipitate, which was filtered after 8 hours reaction time (room temperature) and was then washed with several portions of neutral ice water. After drying in vacuum at 40° C., 20 Torr until constant weight, 22.75 g corresponding to 56.5% of theory of benzaldoxime-blocked p-phenylene diisocyanate was obtained in the form of a light brownish powder. The compound was soluble only in aprotic solvents such as dimethylformamide, dimethylacetamide, dimethylsulfoxide, sulfolan and tetramethylurea, its structure confirmed through elementary analysis, 1H-NMR, IR-spectrum as well as through comparison with a synthetically produced specimen from p-phenylene diisocyanate and benzaldoxime. After neutralization with dilute hydrochloric acid, no further oxime-blocked isocyanate could be obtained. The solution smelled very strongly of benzaldehyde, so that obviously a portion of the benzaldoxime was hydrolytically cleaved under the reaction conditions.

EXAMPLE 7

Analogous to Example 1, 24 g (0.1 Mol) cyclohexane-1,4-bis-N-chloramide as well as 24.3 g (0.2 Mol) benzaldoxime were placed in a solution of 16.1 g (0.402 Mol) sodium hydroxide in 500 ml water. Already upon dripping of the benzaldoxime at 0°–5° C. a colorless crystalline precipitate (probably sodium salt of benzaldoxime) deposited from the reaction mixture, which after reaching room temperature decomposed extensively; after further 15 minutes the reaction mixture became cloudy again and a beige precipitate separated, which in the course of 5 hours at 30° C. grew to a quite voluminous mass. The reaction mixture was then adjusted with dilute hydrochloric acid to a pH of 7, and filtered from the precipitate across a glass frit. The precipitate was washed chloride-free with several portions of ice water, and then dried at 40° C., 20 Torr to constant weight. In this manner 20.6 g (corresponding to 50.4% of theory) of benzaldoxime-blocked trans-cyclohexane-1,4-diisocyanate in the form of a light brownish powder was obtained. Its structure was guaranteed through elementary analysis, as well as IR and 1H-NMR-spectrum as well as through comparison with a synthetic specimen produced from trans-cyclohexane diisocyanate-(1,4) and benzaldoxime. The compound displayed good solubility in aprotic polar solvents and moderate solubility in lower alcohols and ketones, slight solubility in methylene chloride, chloroform, practically no solubility in $CCl_4$, cyclohexane, ligroin and water. The filtrate contained, analogous to Example 6, large amounts of benzaldehyde (obviously hydrolytic decomposition of benzaldoxime).

EXAMPLE 8

23.3 g (0.1 Mol) terephthalic acid-bis-N-chloramide was dissolved in 150 ml dimethylformamide and then gradually dripped into a solution of 32.9 g (0.2 Mol) terephthalic dialdoxime and 16.0 g (0.4 Mol) sodium hydroxide in a half liter of water. The reaction mixture was initially converted for 1 hour at 0°–5° C., then 2 hours at room temperature, and finally 1 hour at 50° C. As described in Example 7, initially upon addition of the terephthalic-bis-N-chloramide a colorless crystalline precipitate separated out, which in the course of the reaction disappeared, whereby simultaneously a new precipitate formed. After the reaction mixture no longer effected oxidizing, the solution was neutralized with dilute hydrochloric acid and subsequently washed chloride-free with several portions of ice water. After drying at 60° C., 1 Torr until constant weight, 38.5 g corresponding to 78.8% of theory of terephthalic aldoxime-blocked p-phenylene diisocyanate was obtained. A further batch of 2.9 g (6.6% of theory) of aldoxime-blocked p-phenylene diisocyanate was obtained from the aqueous DMF-containing solution. The compound displayed good solubility in polar aprotic solvents such as dimethylformamide, dimethylacetamide, dimethylsulfoxide, sulfolan, moderate solubility in dilute caustic soda and practically no solubility in lower alcohols, ketones and water. The structure of the compound was confirmed through elementary analysis, IR, 1H-NMR-spectrum as well as through comparison with a synthetic compound produced from p-phenyldiisocyanate and terephthalic aldoxime.

COMPARISON EXAMPLE 1

23.3 g (0.1 Mol) terephthalic acid-bis-N-chloramide was suspended in a 1-liter 3-necked flask at 0° C. in 700 ml water, and under vigorous stirring mixed drop by drop with 8 g sodium hydroxide (0.2 Mol) (as 40% aqueous solution), whereby the drop velocity was so regulated that the interior temperature did not exceed 5° C. In this manner the terephthalic acid-bis-N-chloramide went into solution in the form of its sodium salt, to which 24.3 g (0.2 Mol) benzaldoxime was dropped at 5° C. Immediately after addition of the first drop of benzaldoxime a colorless crystalline precipitate separated out. The cooling was then removed and the reaction mixture stirred for a total of 8 hours at room temperature. Already after a half hour, the reaction mixture became colored dark brown, and a dark red-brown amorphous precipitate slowly separated out. After the end of the reaction this precipitate was filtered, carefully washed and then dried. In this manner 13.8 g of a phenacyl urea was isolated, which was verified with a synthetic comparison substance produced from p-phenylene diisocyanate and terephthalic acid diamide. An organic layer separated from the aqueous phase, which was clearly identified as benzaldehyde.

COMPARISON EXAMPLE 2

Analogous to Comparison Example 1, 23.3 g (0.1 Mol) terephthalic acid-bis-N-chloramide was suspended in 500 ml dimethylformamide at 0° C. with vigorous stirring, and subsequently carefully mixed portionwise with 16.5 g (0.41 Mol) sodium hydroxide in fine powdered form. Subsequently, and likewise at 0° C., 24.4 g (0.2 Mol) benzaldoxime was added dropwise to the finely-dispersed suspension of the terephthalic acid-bis-N-chloramide-sodium salt. Thereafter it was necessary to carry out a very good cooling, since a strongly exothermic reaction occurs upon dropping in of the aldoxime. The reaction mixture very quickly became colored brown, and already after 1 minute a light brownish precipitate separated out. After the dripping in of the aldoxime was ended, the mixture was further stirred for 2 hours at 5° C., and subsequently the cooling was removed. The reaction temperature rose very quickly to 40° C. and was then further stirred for 7 hours at room temperature. After the conversion ended (as indicated with potassium iodide-starch paper) it was filtered, the adhered dimethylformamide removed through water washing, and carefully dried. In this manner 7.8 g of a light brownish powder was isolated, composed essentially of terephthalic acid diamide as well as terephthalic acid. The filtrate was then carefully compressed to dryness in a good vacuum, and dissolved in dilute hydrochloric acid. A residue remained behind, which after careful washing and drying amounted to 6.9 g, with main components of terephthalic acid, terephthalamide acid as well as benzoic acid. An aqueous solution of this residue was subsequently neutralized with ammonia and through extraction with methylene chloride 2.4 g of paraphenylene diamine was isolated therefrom.

It will be understood that each of the elements described above, or two or more together, may also find a useful application in other types of chemical processes differing from the types described above.

While the invention has been illustrated and described as embodied in a method for the production of blocked isocyanates, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. Method for the production of blocked isocyanates of the general formula

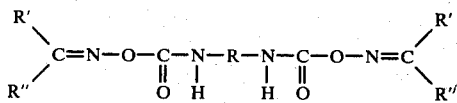

in which R, R' and R" represent an aliphatic, cycloaliphatic or aromatic hydrocarbon group, whereby R' and R" can be the same or different, and when R' is an aromatic group, R" can also be a hydrogen atom, comprising reacting terephthalic dialdoxime, isophthalic dialdoxime or an aliphatic, cycloaliphatic or aromatic ketoxime or an aromatic aldoxime of the general formula

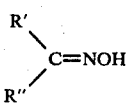

in the presence of 10–100 Mol% sodium-, potassium- or calcium-hydroxide, relative to the ketoxime or aldoxime used, with the sodium-, potassium- or calcium-salt of a bis-N-chloramide of the general formula

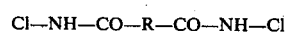

in water or a mixture of water and an aprotic solvent, at temperatures in the range between 20° and 100° C.

2. Method according to claim 1, wherein said aldoxime or ketoxime is selected from the group consisting of terephthalic dialdoxime, benzaldehyde-, cyclohexanone-, acetone- and acetophenone-oxime.

3. Method according to claim 1, wherein said aprotic solvent is selected from the group consisting of dimethyl acetamide, dimethylformamide, sulfolan and tetramethylurea.

4. Method according to claim 1, wherein said temperatures lie in the range between 20° and 60° C.

* * * * *